Feb. 9, 1926.

R. H. MUELLER ET AL 1,572,158

AIR OPERATED TESTING DEVICE

Original Filed Nov. 5, 1921    2 Sheets-Sheet 1

Inventors
Robert H. Mueller
Chester W. Hathaway.

By Cushman, Bryant & Darby
Attorneys

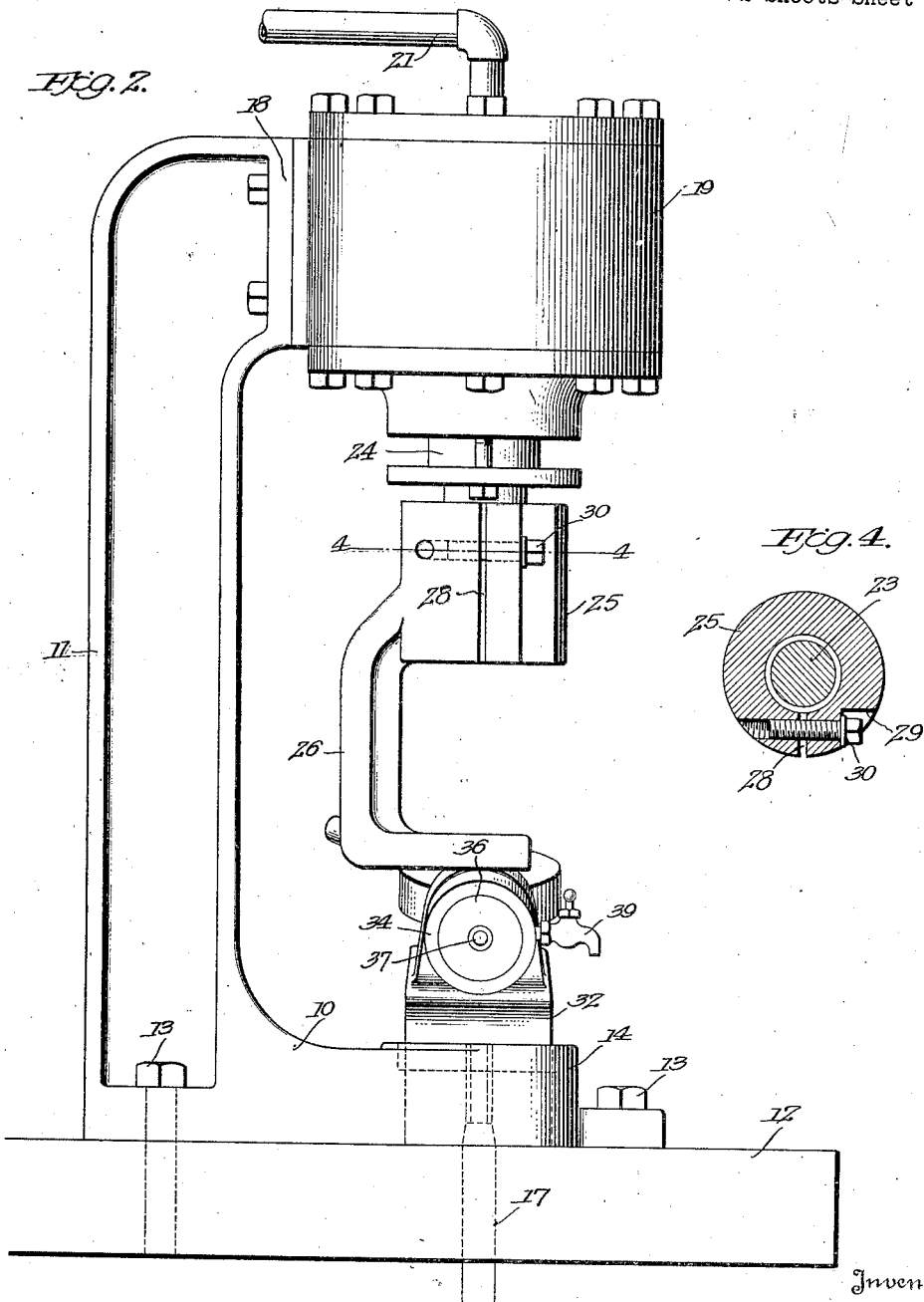

Patented Feb. 9, 1926.

1,572,158

UNITED STATES PATENT OFFICE.

ROBERT H. MUELLER AND CHESTER W. HATHAWAY, OF DECATUR, ILLINOIS, ASSIGNORS TO ADOLPH MUELLER, TRUSTEE, OF DECATUR, ILLINOIS.

AIR-OPERATED TESTING DEVICE.

Original application filed November 3, 1921, Serial No. 512,696. Divided and this application filed May 7, 1924. Serial No. 711,661.

*To all whom it may concern:*

Be it known that we, ROBERT H. MUELLER and CHESTER W. HATHAWAY, citizens of the United States, residing at Decatur, in the county of Macon and State of Illinois, have invented new and useful Improvements in Air-Operated Testing Devices, of which the following is a specification.

The present invention, which is a division of applicants' co-pending application, Serial No. 512,696, filed November 3rd, 1921, has been made the subject of a separate application under official requirement, and relates to testing apparatus for cocks and the like, and more particularly for use in testing for porosity and key leakage of angle cocks, and similar articles which have fluid passages therethrough.

The primary purpose of the invention consists in the provision of means for testing angle cocks, in which the inlet and outlet supplies may be positioned at any angle relative to each other, without necessitating any changes in the construction and operation of the machine, and without removing the cock from the machine.

Referring to the drawings, wherein is disclosed a physical embodiment of our invention.

Figure 2 is a view in side elevation substantially at right angles to the view shown in Figure 1.

Figure 4 is a sectional view taken substantially along the lines 4—4 of Figure 2.

Figures 1, 3:
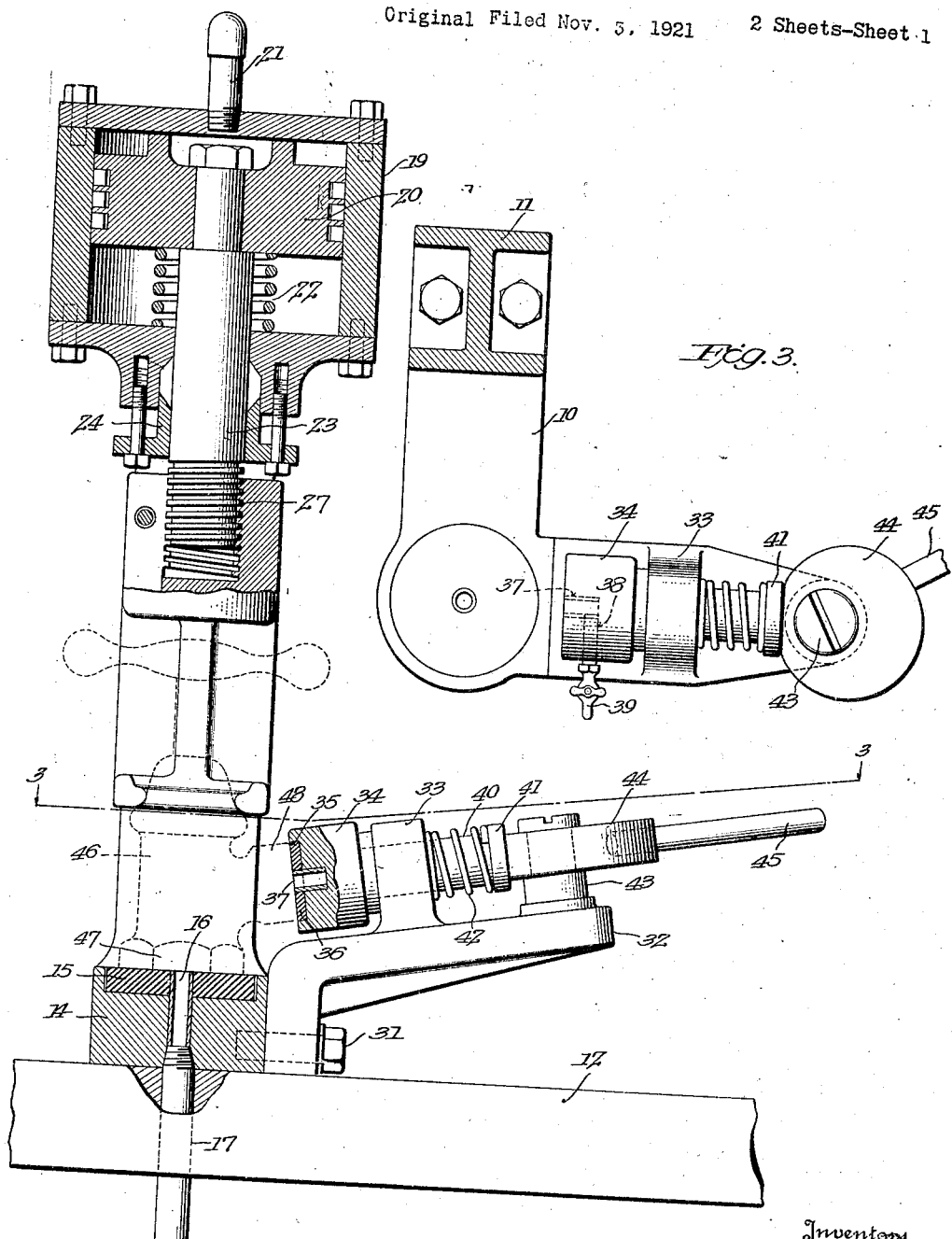
Figure 1 is a front elevational view of the device, parts of the structure being broken away for clearness of illustration.
Figure 3 is a sectional view taken substantially along the lines 3—3 of Figure 1.

Referring to the drawings, wherein like numerals indicate like parts in the several views, 10 denotes a base member having a standard 11 and connected to any suitable support, such as 12 by the bolts 13. The base 10 has a recess boss 14 in which is mounted a cock receiving seat or pad 15 of resilient or yieldable material, which is preferably loosely mounted, as shown, within the recess so that in event of water getting beneath the pad it will not be trapped, and due to pressure, unseat the pad 15 from the recess boss 14. The pad 15 is centered in its seat by means of the pipe 16, which passes upwardly through the support 12 and the base 10 and through a suitable aperture in the pad 15. The pipe 16 is connected to any suitable supply, as 17, for the purpose of furnishing fluid under pressure for testing a cock or the like.

The standard 11 terminates in a head 18, to which is secured the fluid pressure cylinder 19 of any suitable type, and having within a reciprocating piston 20, which is given its thrust in one direction by fluid pressure coming from the supply pipe 21, which is connected with any suitable source and provided with any suitable inlet and exhaust valve controls, so that the operator at will can throw pressure against the piston 20 or release it. The piston 20 is actuated in the opposite direction, in the present disclosure, by the spring 22 which normally tends to raise it. It is obvious that if desired the piston could be operated by pressure in both directions by making the suitable connections as is common in constructions of this kind.

Attached to the piston 20 in any suitable manner is the thrust rod 23 which passes through any suitable opening or guide 24 at its point of exit from the piston chamber 19. In that form of the invention where the lifting spring 22 is used to elevate the piston and its associated parts, the opening 24, through which the thrust rod 23 passes will be of such dimension in cross section as will permit pressure to escape past the thrust rod 23 so that if the fluid should get below the piston it can escape and no opposing pressure will be created below the piston 20. Secured to the lower end of the thrust rod 23 is the clamping member 25, which has depending from one side thereof forked arms 26, which are arranged to pass beneath the handle of the valve so as to hold it firmly during the testing operation.

The clamping member 25 is provided with an internally threaded recess 27, which receives a correspondingly threaded portion of the thrust rod 23. The member 25 is adjustably secured to the thrust rod by reason of it having a longitudinal split 28 and a flat recess portion 29 formed in its outer periphery, through which extends a bolt 30. It will be seen that the member 25 may be run up and down on the rod to shorten or lengthen its effective stroke and that upon tightening the bolt 30 the member will be tightened in its position, and danger of its movement on the screw threaded portion of the thrust rod during the operation of the machine is eliminated.

Extending from one side of the base 10, and preferably secured thereto by any suitable means, such as the bolt 31 is the bracket 32. Mounted in suitable supports, such as, for example, the lug 33 on the bracket is a reciprocating head 34 having a recess base 35 and a sealing pad 36 of a character similar to that described in connection with the pad on the boss 14. Centrally of the pad 36 is disposed the pipe or passage 37 coupled with the lateral branch passage 38, at the outer end of which is mounted a cock or faucet 39, which may be turned to close the passage 38 and the central passage 37.

The head 34 is provided with a thrust rod 40 headed or otherwise suitably formed at its rear end 41 so as to retain between the headed end and the lug 33 the spring 42, which spring tends normally to keep the head 41 in retracted position. Pivotally mounted to the lug 43 on the bracket is an actuating cam 44 having an operating handle 45, which, when thrown into its operating position will drive the head 34 inwardly against the nipple of the cock so that the yielding pad 36 will seal the nipple, and the cock will be in position for testing.

With the parts constructed as shown and described, the operation of testing the angle cock for porosity, and in the case of keycocks, the leakage past the keys will be as follows:

The angle cock 46 conventionally indicated in dotted lines in Figure 1 will be placed in the position shown with its lower nipple 47 seated upon the pad 15 over the fluid pressure inlet 17 for the testing fluid, and the angularly disposed nipple 48 shown at an angle greater than a right angle to the body of the cock, will be brought into engagement with the pad 36 on the head 34 by actuation of the lever 45 against the resistance of the spring 42. Obviously, the nipple 48 may be at right angles to the body of the cock or any other suitable angle, as the position of the work demands.

The forked arms 26 of the clamping member 25 will be brought into engagement with the top of the cock 46 through the admission of pressure from the pipe 21 onto the piston 20, forcing the seat piston downward, together with the thrust rod 23 and the forked arms 26, which have been adjusted as to length of stroke for the particular type of cock being tested.

It will be seen that due to the compression exerted by the forked arms 26, the cock 46 will be securely held in position.

The testing fluid will then be admitted by the pipe 17 to the interior of the cock body, and if it be a key-cock, the key will be turned to open position so that the testing fluid can fill the body of the cock. The faucet 39 at the end of the lateral passage 38 will be closed so that there can be no escape of fluid by the passage. The testing pressure can be run up to the desired degree, and the operator may observe the cock under pressure and determine whether or not it is defective by reason of porosity or fault in the material, for under the retained pressure in the cock body, porosity will be shown by leakage through any fault in the wall of the cock body which may be present.

When it is desired to test for key faults in connection with key cocks, the key of the cock will be turned to closed position, and the faucet 39 at the end of passage 38 which communicates through passage 37 with the interior of the cock will be opened.

Pressure then being applied to the lower part of the cock body, through the passage 16, will stand against the closed key of the cock, and if there be any leakage about the key so as to permit the testing fluid to pass, it will be at once apparent by reason of flow or drip from the faucet. Any suitable waste, not shown, may be provided for receiving the drip from the faucet 39.

From the foregoing, it will be seen that there is provided a testing machine which may be conventionally used for testing both for porosity and for key leakage of valve bodies, valve seats and the like, without removing the cock from the machine, and that is adapted for handling angle cocks having their nipples positioned at any desired angle relative to each other without necessitating any radical changes in the construction and operation of the machine.

It is to be understood that the form of invention herein disclosed is merely illustrative, and in no sense restrictive, and that such mechanical changes, other than those herein shown, may be made without departing from the range of the invention and the scope of the appended claims. Further that the phrase "fluid pressure" includes hydraulic or air pressure.

We claim:

1. In apparatus for testing angle cocks and the like, the combination of a base to receive a cock nipple and having a fluid pressure inlet, a bracket secured to the side of the base, a movable pressure head on said bracket having a fluid pressure outlet and adapted to engage the other nipple of the cock, means to normally hold said pressure head retracted, means for moving said head, and means to clamp the cock on said base.

2. In apparatus for testing angle cocks and the like, the combination of a base to receive a cock nipple and having a fluid pressure inlet, a bracket secured to the side of the base, a movable pressure head on said bracket having a fluid pressure outlet and adapted to engage the other nipple of the cock, a spring normally holding said head retracted, means pivoted to said bracket for moving said head into engagement with the last mentioned nipple, and means to clamp the cock to said base.

3. In apparatus for testing angle cocks and the like, the combination of a base to receive a cock nipple and having a fluid pressure inlet, a bracket secured to the side of the base, a movable pressure head on said bracket having a fluid pressure outlet and adapted to engage the other nipple of the cock, means for controlling flow through said outlet, a spring normally holding said pressure head retracted, and means for moving said head in opposition to the spring and into engagement with the cock nipple.

4. In apparatus for testing angle cocks and the like, the combination of a base to receive a cock nipple and having a fluid pressure inlet, a bracket secured to the side of the base, a movable pressure head on said bracket, having a fluid pressure outlet and adapted to engage the other nipple of the cock, means for controlling flow through said outlet, a spring normally holding said pressure head retracted, and a cam pivoted on said bracket for actuating said head into engagement with the cock nipple.

5. In apparatus for testing angle cocks and the like, the combination of a base to receive a cock nipple and having a fluid pressure inlet, a bracket secured to the side of the base, a movable pressure head on said bracket having a fluid pressure outlet and adapted to engage the other nipple of the cock, a spring normally holding said head retracted, means pivoted to said bracket for moving said head into engagement with the last mentioned nipple, means to clamp the cock to said base, including a clamping member having a depending forked arm adapted to engage said cock and secure the latter in position on the base.

6. In apparatus for testing angle cocks for porosity and leakage, the combination of a base having a seat to receive a cock nipple and an inlet for fluid pressure, movable clamping means for securing the cock to the base, a movable pressure head positioned on one side of said base to engage the other nipple of the cock and having a fluid pressure outlet passage, and means for opening and closing said outlet passage.

7. In apparatus for testing angle cocks for porosity and leakage, the combination of a base having a resilient seat to receive a cock nipple and an inlet for fluid pressure, movable clamping means for securing the cock to the base, a normally retracted movable pressure head having a resilient seat to receive the other nipple of the cock and having a fluid pressure outlet passage, and a control cock for said passage.

8. In apparatus for testing angle cocks and the like for porosity and key leakage, the combination of a base having a resilient seat to receive a cock nipple and an inlet for fluid pressure, a movable clamping member for securing the cock to said base, a movable pressure head positioned on one side of said base and having a fluid pressure passage, a spring normally holding said pressure head retracted, and a cam means for moving said head.

9. In apparatus for testing angle cocks, the combination of a base to receive a cock nipple and having an inlet for fluid pressure, a clamping member for securing the cock to the base, a bracket on the side of said base, a pressure head longitudinally movable on said bracket and adapted to engage the other nipple of the cock, said pressure head having a fluid outlet passage, manually controlled means for moving said head in one direction, and means to automatically move said head in the opposite direction.

10. In apparatus for testing angle cocks, the combination of a base to receive a cock nipple and having an inlet for fluid pressure, a clamping member for securing the cock to the base, a bracket on the side of said base, a pressure head longitudinally movable on said bracket and adapted to engage the other nipple of the cock, said pressure head having a fluid outlet passage, means for controlling flow through said outlet, a spring normally holding said pressure head retracted, a cam mounted on said bracket, and an operating handle connected to said cam for moving said pressure head.

11. In apparatus for testing angle cocks and the like for porosity and key leakage, the combination of a base having a seat to receive a cock nipple and an inlet for fluid pressure, a movable clamping member for securing the cock to said base, a movable pressure head disposed to an angle to engage the other cock nipple, there being a fluid pressure outlet traversing said head, means for controlling flow through said outlet, a spring normally acting to hold said pressure head retracted, and a cam actuated means for moving said head.

12. In apparatus for testing angle cocks and the like for porosity and key leakage, the combination of a base having a resilient seat to receive a cock nipple and an inlet for fluid pressure, a movable clamping member having a depending forked arm for securing the cock to said base, a movable pressure head disposed at an angle and inclined relative to said base seat to engage the other cock nipple, said head having a resilient seat socket therein and a fluid pressure outlet traversing said head, means for controlling flow through said outlet, a spring normally acting to hold said pressure head retracted, and a cam actuated means for moving said head.

In testimony whereof we have hereunto set our hands.

ROBERT H. MUELLER.
CHESTER W. HATHAWAY.